United States Patent [19]

Choe et al.

[11] Patent Number: 5,334,239
[45] Date of Patent: Aug. 2, 1994

[54] PASSIVE GAS SEPARATOR AND ACCUMULATOR DEVICE

[75] Inventors: Hwang Choe, Saratoga; Thomas T. Fallas, Berkeley, both of Calif.

[73] Assignee: The United States of America as represented by the United States Department of Energy, Washington, D.C.

[21] Appl. No.: 158,338

[22] Filed: Nov. 29, 1993

[51] Int. Cl.$^5$ ............................................ B01D 19/00
[52] U.S. Cl. ...................................... 95/261; 55/337; 95/262; 95/268; 95/269; 95/284; 96/187; 96/195; 96/208; 96/219; 96/220
[58] Field of Search .................. 55/337, 398, 399; 95/261, 262, 268, 269, 273, 284; 96/187, 193, 194, 195, 208, 219, 220

[56] References Cited

U.S. PATENT DOCUMENTS

| | | | |
|---|---|---|---|
| 3,581,464 | 6/1971 | Bhuta et al. | 96/193 X |
| 3,603,062 | 9/1971 | Robbins et al. | |
| 3,622,265 | 11/1971 | Weber et al. | |
| 3,771,290 | 11/1973 | Stethem | 96/210 |
| 4,008,059 | 2/1977 | Monson et al. | |
| 4,081,249 | 3/1978 | Baillie | |
| 4,205,965 | 6/1980 | Bielefeldt | |
| 4,218,223 | 8/1980 | Lidstone et al. | |
| 4,306,995 | 12/1981 | Baillie | |
| 4,427,421 | 1/1984 | Jensen et al. | 96/208 X |
| 4,537,740 | 8/1985 | Colburn | |
| 4,848,987 | 7/1989 | Howard et al. | |
| 4,976,754 | 12/1990 | Edelstein et al. | |
| 5,000,764 | 3/1991 | Oshiyama et al. | 96/219 |

FOREIGN PATENT DOCUMENTS

2082942A 3/1982 United Kingdom .

OTHER PUBLICATIONS

Choe et al., "SP-100 Gas Separator/Accumulator," published/distributed at 1989 Space Nuclear Power Symposium, Jan. 1989.

Primary Examiner—Charles Hart
Attorney, Agent, or Firm—Miguel A. Valdes; Roger S. Gaither; William R. Moser

[57] ABSTRACT

A separation device employing a gas separation filter and swirler vanes for separating gas from a gasliquid mixture is provided. The cylindrical filter utilizes the principle that surface tension in the pores of the filter prevents gas bubbles from passing through. As a result, the gas collects in the interior region of the filter and coalesces to form larger bubbles in the center of the device. The device is particularly suited for use in microgravity conditions since the swirlers induce a centrifugal force which causes liquid to move from the inner region of the filter, pass the pores, and flow through the outlet of the device while the entrained gas is trapped by the filter. The device includes a cylindrical gas storage screen which is enclosed by the cylindrical gas separation filter. The screen has pores that are larger than those of the filters. The screen prevents larger bubbles that have been formed from reaching and interfering with the pores of the gas separation filter. The device is initially filled with a gas other than that which is to be separated. This technique results in separation of the gas even before gas bubbles are present in the mixture. Initially filling the device with the dissimilar gas and preventing the gas from escaping before operation can be accomplished by sealing the dissimilar gas in the inner region of the separation device with a ruptured disc which can be ruptured when the device is activated for use.

12 Claims, 2 Drawing Sheets

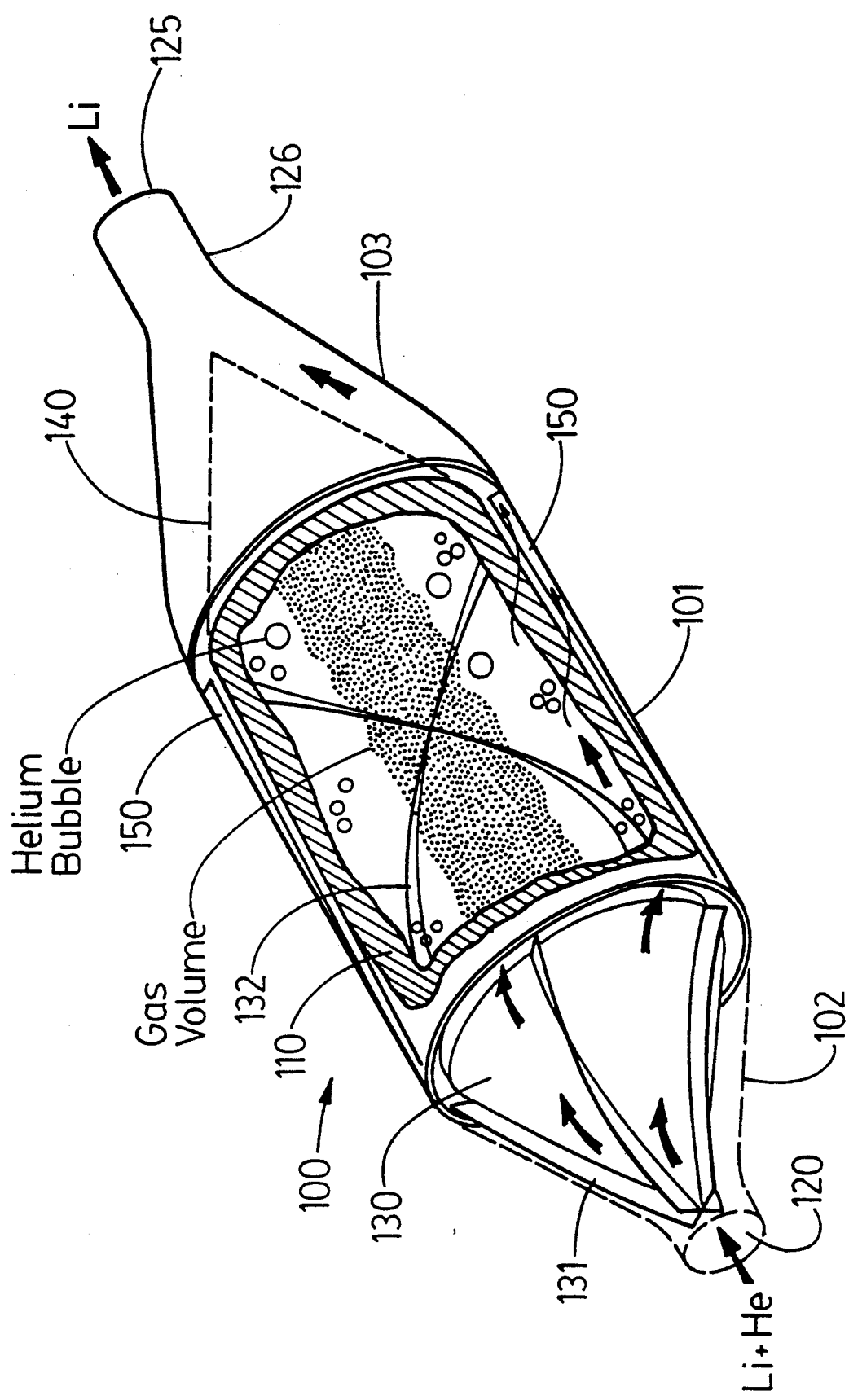
FIG._1.

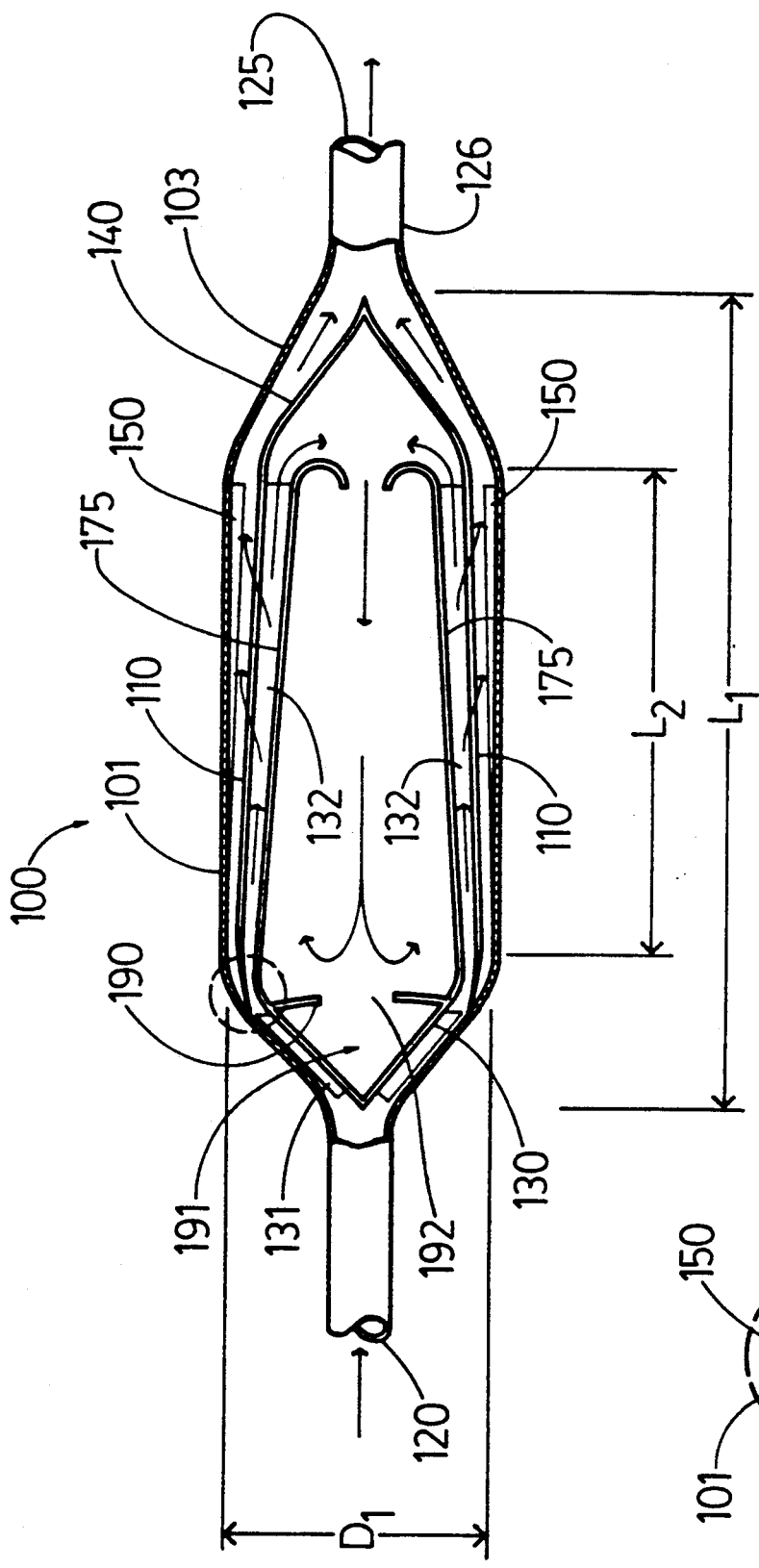
FIG._2.
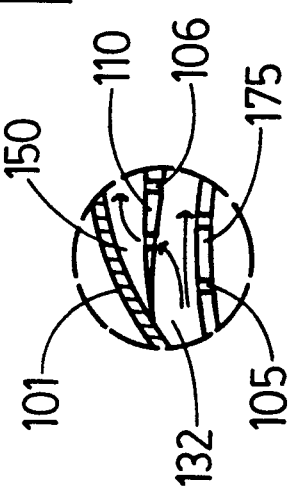
FIG._3.

PASSIVE GAS SEPARATOR AND ACCUMULATOR DEVICE

This invention was conceived during performance of U.S. Government Contract No. DE-AC03-86SF16006.

FIELD OF THE INVENTION

The present invention relates generally to gas/liquid separation and particularly to a device that separates and stores helium gas from a lithium flow stream under micro-gravity conditions.

BACKGROUND OF THE INVENTION

In many processes it is necessary to separate gases from a gas-liquid mixture. For instance, in some pump-operated installations, such as heating and cooling water installations, the circulator pump conveys a certain amount of gas with the liquid. This gas can lead to difficulties in both the installation and pump. This applies especially in the case of hot water central heating systems where air situated in the system is the cause of many problems. U.K. Patent application GB-2,082,942, published Mar. 17, 1992, describes a device for removing gas from a liquid that includes a separation chamber situated between entry and exit pipes. As the gas-liquid mixture is fed into the chamber with a twisting motion, the gas in the centrifugal field of the flow is forced toward the center of rotation which is on the center line of the chamber and passes to an outlet opening while the degassed liquid flows away to the exit pipe at the circumference of the chamber. The device also has a sieve tube arranged coaxially in the chamber which separates the gas from the liquid. The gas is continuously discharged into the atmosphere or into a separate storage unit.

Another device which relies on centrifugal separation is described in U.S. Pat. No. 3,603,062, issued Sept. 7, 1971. This apparatus is a high-capacity gas centrifugal separator adapted to receive a gas-liquid mixture and for creating a gas vortex surrounded by a liquid vortex. The separator includes a primary discharge passage for receiving liquid from the liquid vortex and having means for arresting the rotary motion of the separated liquid and a secondary discharge passage having means for separating the gas and liquid from the boundary layer between the gas and liquid vortices in the separator.

Screen-type separators are found in U.S. Pat. No. 4,976,754, issued Dec. 11, 1990, which describes a liquid line trap for non-condensable gases which comprises an outer cylindrical tube and a mesh inner tube axially positioned within the outer tube. The capillary action of the mesh tube traps non-condensable gas within an annular space between the inner and outer tubes. The separated liquid flows radially inward and through the mesh inner tube which has an outlet for the liquid. The trap can operate under zero gravity as well as normal ambient conditions. Finally, U.S. Pat. No. 4,537,740, issued Aug. 27, 1985, describes a device for collecting fission gas that has been released into coolant. The device uses filters for gas bubble separation wherein the surface tension in the pores of the filters prevents entrained gas bubbles from passing through the filters.

Despite the existence of these conventional gas-liquid separation devices, there is a need for a gas-liquid separation device that efficiently separates trace quantities of a gas forming component from a liquid mixture. Furthermore, the device preferably can begin separation even before the component forms gas bubbles in the mixture.

SUMMARY OF THE INVENTION

It is the object of the present invention to provide a gas separator/accumulator device, that requires no moving parts (i.e., passive device), for separating gas from a gas-liquid mixture under micro-gravity conditions and for storing the gas without interfering with the separation efficiency of the device.

It is a further object of the present invention to provide a device for separating helium from a helium-lithium flow stream under microgravity conditions wherein the device is initially filled with a dissimilar gas such as argon to facilitate helium separation.

These and other objects are accomplished with the inventive device which employs a gas separation filter and swirler vanes as the principle components that are housed in the device. The cylindrical filter for gas bubble separation relies on the principle that surface tension in the pores of the filter prevents gas bubbles from passing through. As a result, the gas collects in the interior region of the filter and coalesces to form larger bubbles that accumulate in the center of the filter. The device is particularly suited for microgravity applications since the swirlers induce a centrifugal force which causes liquid to move from the inner region of the filter, pass the pores, and flow through the outlet of the device whereas the entrained gas is trapped by the filter and stored within the gas storage screen.

An important aspect of the invention is that the device can be initially filled with a dissimilar gas (e.g. argon) other than that which is to be separated (e.g. helium). This technique results in separation of the gas forming component (helium) even before gas bubbles are formed in the mixture by means of diffusion. Initially filling the device with a dissimilar gas and preventing the gas from escaping before operation can be accomplished by trapping the dissimilar gas within a compartment of the separation device with a rupture disc which can be ruptured when the device is activated for use on line.

The device can also include a cylindrical gas storage screen which is enclosed by the cylindrical gas separation filter. The screen has pores that are larger than those of the filters. The screen prevents larger bubbles that have been formed from reaching and interfering with the pores of the gas separation filter.

BRIEF DESCRIPTION OF THE DRAWINGS

FIG. 1 is a partially broken away perspective view of the gas separator/accumulator device.

FIG. 2 is a cross-sectional view of the gas separator/accumulator device.

FIG. 3 is a detail from FIG. 2.

DESCRIPTION OF THE PREFERRED EMBODIMENTS

FIG. 1 is a partially broken away perspective view of a gas separator/accumulator device comprising a hollow outer shell (or housing member) 100 that has a cylindrical middle section 101 and tapered front section 102 and back section 103. Outer shell 100 preferably defines a hollow interior or chamber with a cylindrical cross-section. The chamber defined by middle section 101 encloses a cylindrical gas separation filter 110 that is axially disposed along the length of middle section 101.

The chamber defined by front section 102, which has a tapered contour, encloses cone shaped deflector 130 which has a plurality of front swirler vane guides (or preswirlers) 131 attached to the outer surface thereof. One end of the gas separation filter is attached to the base perimeter of cone shaped insert 140 which is enclosed by the chamber defined by back section 103. The other end of the cylindrical gas separation filter is positioned adjacent to the perimeter of the deflector such that a gas-liquid mixture can flow over the deflector surface then through an aperture between the deflector and filter and finally into the inner region of the gas separation filter. The filter comprises a hollow cylindrical tube having pores 106 (as shown in FIG. 3) that are effective to prevent passage of the gas bubbles larger than the pore size. The diameter(s) of the pores can vary depending on the level of separation desired, type of gas-liquid mixture involved, and other operation conditions. As illustrated in FIG. 1, the trapped gases will coalesce to form large bubbles. For some applications, the cylindrical filter can comprise a wire mesh tube as described in Edelstein et al., U.S. Pat. No. 4,976,754, issued Dec. 11, 1990, which is incorporated herein.

Attached to the inner surface of gas separation filter 110 are main or primary swirler vanes 132. The primary swirler vane is also preferably attached to an outer surface of the gas storage screen, which is described below. These vanes do not extend all the way to the center of the filter's inner region so that any accumulated gas therein can behave as a single gas volume. Under microgravity conditions (e.g. outer space), gravity cannot be used to accumulate the separated gas. Therefore, the vanes of the preswirlers and main swirlers are used to create a flow induced centrifugal force which facilitates separation under these conditions. The preswirler vanes on the deflector creates a centrifugal force as soon as a mixture of gas and liquid enters the device. The deflector cone also protects the accumulated gas inside the filter from the in-coming gas-liquid flow. Swirling is maintained over the length of the gas separation filter by the main swirler vanes that are positioned between the filter and the gas storage screen 175 (as shown in FIG. 2). By collecting the gas along the center line of the device, liquid flow can freely pass through the filter with a minimal pressure drop. Moreover, in the event that flow stops, the gas storage screen 175 will keep the collected gas within the gas storage screen and surface tension will help maintain the accumulated volume along the center line by way of Maragoni forces. The device also includes a plurality of flow straightener vanes 150 that are located in the annular space between gas separation filter 110 and the inner surface of middle section 101. The flow straightener vanes are positioned to recover the majority of the kinetic energy associated with the swirling of the liquid before the liquid flows toward the exit. The gas separator/accumulator device has an inlet 120 and outlet 125 which are located at the front section 102 and back section 103, respectively. Preferably, the interior regions of the device which come into contact with the gas and liquid should be rounded; moreover, the interior regions should be designed so that flow areas change gradually and sufficient filter area should be provided to minimize frictional losses.

FIG. 2 is a cross-sectional view of the device of FIG. 1; the same reference numbers are used to designate the same parts of the device. Although the size of the inventive device and components thereof can be varied to accommodate different gas-liquid mixtures and operating conditions, the velocity of the gas-liquid mixture entering the device must be high enough to create the centrifugal force required for separation. In one embodiment as shown in FIG. 2, the inner diameter of the inlet and outlet is approximately 4 cm, while $D_1$ is approximately 22 cm, $L_1$ is approximately 57 cm and $L_2$ is approximately 32 cm. For this design, the gas-liquid mixture should pass through the inlet at a flow rate of approximately 10 ft/sec (3.05 m/sec). The design of the gas separation filter will depend on a number of factors, including the specific and relative amounts of gas and liquid components to be separated, their flow rates, and the desired pressure drop across the filter. Preferably, the size and number of pores in the filter are chosen so that the surface tension in the pores will prevent essentially all the gas bubbles from passing through the filter. A large total flow area through the gas separation filter allows the liquid to pass through the filter with only a small pressure drop. The filter pore size can be set so that bubbles that are small enough to pass through the pores are ones that can be tolerated. In addition, the filter pore size should be large enough so that microscopic impurities do not clog the filter. The design of filters for gas bubble separation is further explained in Colburn, U.S. Pat. No. 4,537,740, issued Aug. 27, 1985, which is incorporated herein.

The gas separator/accumulator device is particularly suited for separating gas from a gas-liquid mixture under microgravity conditions where the amount of the gas forming component in the mixture is small. For instance, lithium is typically used as the working fluid in space reactor power systems because of its excellent heat transfer characteristic and low density. The systems, however, produce tritium and helium as a result of lithium irradiation. Tritium has a high diffusion coefficient through the materials that make up the reactor vessel wall and therefore can leak through the walls. Helium, on the other hand, has a much lower coefficient so that the majority of it remains inside the reactor vessel for the life of the space reactor power system. When a large amount of helium accumulates in the lithium coolant, the helium interferes with the heat transfer characteristics of the system and reduces system performance. Therefore, it is necessary to separate helium gas from the lithium flow stream and to store the gas. Besides helium, other fission gases can also escape from fuel pins, and they can be separated and stored by the device as well.

The lithium flow stream circulates through a closed loop consisting of components, piping, and the inventive device. In operation, in order to separate helium from a lithium flow stream, the gas-liquid mixture enters inlet 120 of the gas separator/accumulator device as shown in FIGS. 1 and 2. The preswirler vanes 131 create a centrifugal force that creates a force field so that gaseous helium flows toward the center of the device while the lithium flows toward the inner surface of the shell. The gas separation filter separates the larger helium bubbles from the lithium flow which exits through outlet 125. To separate gaseous helium from a lithium flow in space reactor power systems, the gas separation filter pore size should be approximately 100 to 200 microns, and the minimum gap elsewhere in the flow loop should be approximately 700 microns which is approximately one order of magnitude greater than the filter pore size. The filter can be fabricated by twilled weave screen, or the holes of the filter can be fabricated by conventional means including drilling, etching, and electro-discharge machining. The filter manufactured in this manner provides relatively low mass but high strength. Although the device can be fabricated from any suitable material, for space reactor power systems, Nb-1Zr, a niobium-zirconium alloy containing 1% zirconium, is preferred.

The gas storage screen 175 comprises a perforated cylindrical tube that is axially positioned inside gas separation filter 110. The gas storage screen has pores 105 (as shown in FIG. 3) that are larger in size than those of the gas separation filter. Typically the pore size of the gas storage screen ranges from 500 to 1,000 microns. The gas storage screen is designed to store gas bubbles with the given flow field as indicated by the arrows. The collected gas is captured in the inner region within the gas storage screen. When the diffusion process separates gas, the dissolved gas in the lithium is transported into the gas storage screen and stored with the dissimilar gas. By adding the gas storage screen, the stored gas is protected against possible reverse flow conditions (that is, the screen prevents stored gas bubbles from escaping through the inlet in the event of reverse flow), low flow conditions with strong accelerations, and strong acceleration field conditions. Without the gas storage screen, the accumulated gas blocks the top portion of the gas separation filter. With the gas storage screen, the accumulated gas is confined within the gas storage screen, and a clear flow passage is provided between the gas separation filter 110 and the gas storage screen 175. The main or primary swirler vanes are preferably located between the gas separation filter and gas storage screen.

The accumulated gas stays in the inner region of the gas separation filter due to the gas storage screen and the centrifugal force, but even if the gas-liquid mixture flow stops, surface tension at the pores of the gas storage screen prevents the gas from escaping. Furthermore, if the housing or outer shell is cooled and the center region stays hotter than the surface of the device, Maragoni forces maintain the gas volume near the center of the inner region of the filter. In the absence of gravity, the gas volume stays in the middle of this device which acts as an accumulator. Therefore, with the inventive device there is no need to continually remove the separated gas or to provide a special storage unit.

By adjusting the vane angles of the preswirler and main swirler and the gas separation filter porosity distribution, the shape of the accumulated gas volume can be controlled. Specifically, the vane angle affects the rotational velocity and therefore the magnitude of centrifugal acceleration created by the gas-liquid mixture flow. The filter porosity distribution influences how much flow stays in a particular location and therefore the flow velocity, which in turn affects the centrifugal acceleration. Finally, the centrifugal acceleration distribution directly affects the accumulated gas volume shape. The use of vanes to direct flow in separation devices is further described in Monson et al., U.S. Pat. No. 4,008,059, issued Feb. 15, 1977, Baillie, U.S. Pat. No. 4,081,249, issued Mar. 28, 1978, and Baillie, U.S. Pat. No. 4,306,995, issued Dec. 22, 1981, all of which are incorporated herein.

The device, which requires no moving parts, is designed to minimize the pressure drop required to achieve separation. For instances, the cone shaped annular flow area (or inlet channel) between the deflector and the front section preferably increases gradually so that the pressure drop associated with flow swirling occurs at a lower velocity. The annular flow area at the base of the cone shaped deflector is preferably approximately twice the entrance flow area at inlet 120. This arrangement still provides sufficient centrifugal acceleration (approximately 2 g) at the exit of the deflector when the flow velocity is 10 ft/sec at the entrance and the device has the above referenced dimensions. The gas separation filter surface area is preferably approximately 150 times the entrance pipe area so that the flow velocity approaching the filter is relatively quite low. Furthermore, the annular flow area at the base of the cone shaped insert 140 is preferably approximately four times the area of inlet 120 in order to reduce flow losses in the annulus (or outlet channel) between the filter and the housing. Finally, flow straightener vanes located in the annulus between the filter and the middle section are used to recover a majority of the kinetic energy associated with swirling before the flow reaches the exit pipe 126.

As described previously, space power reactors produce helium as a result of lithium irradiation. If the initially filled gas in the device of FIG. 2 is helium, little or no helium separation occurs until the helium concentration in the liquid lithium exceeds the saturation level so that helium bubbles are formed. However, when a dissimilar gas such as argon is used for the initial fill, helium separation occurs as soon as helium is produced and dissolved in the lithium by virtue of diffusion, even before helium gas bubbles are formed. "Dissimilar gas" means any suitable noncondensable gas other than the gas forming component in the liquid mixture that is being separated. Diffusion occurs because the argon gas (or other suitable dissimilar gas) space does not contain any helium (called the zero helium concentration level) initially and the dissolved helium concentration level in lithium is positive even before the saturation level. Diffusion always occurs from a higher to a lower concentration. As the diffusion process continues, the helium concentration in the gas space inside the gas separator/accumulator increases, although the helium level is always below the saturation level (i.e., never 100% helium because of the initially filled dissimilar gas). This technique of using an initial dissimilar gas allows helium separation to start before helium gas bubbles are formed.

The dissimilar gas can be injected into the inventive device after it has been installed in a reactor system. However, a more practical method is to provide a separate compartment containing the dissimilar gas in the device wherein the compartment can be activated or disrupted to release the dissimilar gas just before the reactor is put into service. For instance, a compartment can be releasably enclosed with a sealant that can be disrupted to release the dissimilar gas. One requirement is that the sealant or any other apparatus used to temporarily seal the compartment not be a source of debris or other contaminants that would adversely affect gas-liquid separation when the compartment is activated or released.

In one preferred embodiment as shown in FIG. 2, the device includes a rupture disc 190 which allows precise amounts of dissimilar gas to be stored in compartment 191 during fabrication of the device. Thus, there is no need to fill gas (e.g. argon) during the final assembly and lithium fill of the space reactor power system. Filling gas during the lithium fill process is cumbersome, difficult, time consuming, and not precise. Having the rupture disc shortens the time for lithium fill and provides much more accurate filling of gas. The rupture disc is attached to the perimeter of deflector cone 130 so as to enclose compartment 191 in which the dissimilar gas is stored. After the rupture disc is ruptured by overpressurization, a passage 192 is created through which the dissimilar gas escapes. The rupture disc should be located in a part of the device so that it will not interfere with the separation of gas-liquid mixture. Typically, the rupture disc rupture pressure is designed at 20 to 30 psi, and the system pressure during the lithium fill process is approximately 15 psia. During the lithium fill process, the system pressure can be easily raised to 40 to 50 psia for a brief period to rupture the disc. For space reaction power systems, the coolant boundary is designed for creep of less than 2% for 10 years at 1,375° K. (2,015° F). At the lithium fill temperature of 500° K., the coolant boundary can easily withstand pressures well over 100 psi.

It is to be understood that while the invention has been described above in conjunction with preferred specific embodiments, the description and examples are intended to illustrate and not limit the scope of the invention, which is defined by the scope of the appended claims.

It is Claimed:

1. A device for separating and accumulating gas bubbles from a gas-liquid mixture which comprises:
    a housing member having a cylindrical inner surface that defines an inner chamber, said housing member having a front section with an inlet and a back section with an outlet, wherein said front section has an inner front surface that defines a front chamber;
    a cylindrical gas separation filter, with a first end and a second end, that is axially positioned within said inner chamber, said gas separation filter having an aperture at the first end for receiving the gas-liquid mixture, said gas separation filter defining an inner region that is in fluid communication with said aperture, wherein said gas separation filter has pores of a size effective to prevent passage of gas bubbles;
    a cone shaped deflector, having a first side and a second side, that is positioned within said front chamber wherein the deflector and inner front surface of said front chamber define an inlet channel that is in fluid communication with the inlet and the aperture;
    a cylindrical gas storage screen axially positioned within said inner region and enclosed by the gas separation filter wherein said gas storage screen has pores that are greater in size than those of said gas separation filter; and
    one or more front swirler vanes located in said inlet channel, said front swirler vanes adapted for inducing a flow of liquid preferentially toward the cylindrical inner surface of the housing member.

2. The device as defined in claim 1 wherein the second side of the cone shaped deflector defines a compartment that is filled with a dissimilar gas and that is enclosed by a rupture disc.

3. The device as defined in claim 1 wherein the front section of the housing member has a tapered contour and wherein the one or more front swirler vanes are located between the deflector cone and the front section of the housing member.

4. The device as defined in claim 1 further comprising a cylindrical gas storage screen axially positioned within said inner region and enclosed by the gas separation filter wherein said gas storage screen has pores that are greater in size than those of said gas separation filter, wherein said gas storage screen is adapted to trap accumulated gas bubbles, to prevent gas bubbles from blocking the pores of the gas separation filter, and to prevent accumulated gas bubbles from escaping past the gas storage screen under reverse flow conditions.

5. The device as defined in claim 4 further comprising one or more primary swirler vanes that are attached to an inner surface of the gas separation filter and an outer surface of the gas storage screen.

6. The device as defined in claim 5 wherein said inlet channel has an annular cross section that gradually increases in cross sectional area.

7. The device as defined in claim 6 further comprising one or more flow straightening vanes positioned between said cylindrical inner surface of the housing member and said gas separator filter.

8. The device as defined in claim 7 wherein said back section has an inner back surface and the device further comprising a cone shaped insert that is attached to the second end of the gas separation filter, and wherein the inner back surface and the insert define an outlet channel that is in fluid communication with said outlet.

9. A method for separating gases and storing the separated gas in the form of gas bubbles from a gas/liquid mixture comprising the step of causing said mixture to flow into the device of claim 1.

10. The method as defined in claim 9 wherein the second side of the cone shaped deflector defines a compartment that is filled with a dissimilar gas and that is enclosed by a rupture disc, the method further comprising the step of rupturing the disc with pressure thereby releasing the dissimilar gas.

11. The method as defined in claim 9 further comprising the step of filling a portion of the inner region that is enclosed by the cylindrical gas storage screen with dissimilar gas thereby causing the gas in the gas/liquid mixture, including gases that are dissolved in the liquid, to diffuse into said portion of the inner region that is enclosed by the gas storage screen and thereby preventing the formation of gas bubbles in the liquid.

12. The method as defined in claim 11 wherein said inlet channel has an annular cross-section that gradually increases in cross-sectional area thereby preventing flow disturbances and achieving a low pressure drop across the device.

* * * * *